(12) United States Patent
Kawamoto et al.

(10) Patent No.: US 7,658,558 B2
(45) Date of Patent: Feb. 9, 2010

(54) SHUTTER AND OPTICAL APPARATUS HAVING THE SAME APPARATUS

(75) Inventors: Hisashi Kawamoto, Chiba (JP); Kazuya Shioda, Chiba (JP); Phichet Numnual, Chiba (JP)

(73) Assignee: Seiko Precision, Inc., Chiba (JP)

(*) Notice: Subject to any disclaimer, the term of this patent is extended or adjusted under 35 U.S.C. 154(b) by 0 days.

(21) Appl. No.: 12/165,696

(22) Filed: Jul. 1, 2008

(65) Prior Publication Data

US 2009/0003823 A1 Jan. 1, 2009

Related U.S. Application Data

(63) Continuation of application No. 11/343,607, filed on Jan. 30, 2006, now Pat. No. 7,441,966.

(51) Int. Cl.
*G03B 9/00* (2006.01)
*G03B 9/04* (2006.01)
*G03B 9/10* (2006.01)

(52) U.S. Cl. .................. 396/458; 396/459; 396/493

(58) Field of Classification Search ........... 396/449, 396/450, 458, 459, 493; 348/296, 367; 359/237
See application file for complete search history.

(56) References Cited

U.S. PATENT DOCUMENTS

| | | | |
|---|---|---|---|
| 5,953,550 A * | 9/1999 | Aoshima | 396/458 |
| 6,086,267 A * | 7/2000 | Tsuzuki et al. | 396/459 |
| 6,123,468 A | 9/2000 | Furlani et al. | 396/463 |
| 6,350,068 B1 * | 2/2002 | Tsuzuki et al. | 396/450 |
| 6,443,635 B1 | 9/2002 | Matsumoto et al. | 396/463 |
| 6,467,975 B1 * | 10/2002 | Tsuzuki et al. | 396/449 |
| 6,491,450 B1 | 12/2002 | Mizukami | 396/453 |
| 6,585,429 B2 * | 7/2003 | Yaginuma et al. | 396/458 |
| 6,767,145 B2 * | 7/2004 | Eguro | 396/458 |

FOREIGN PATENT DOCUMENTS

| | | |
|---|---|---|
| JP | 5079541 | 10/1993 |
| JP | 8313969 | 11/1996 |
| JP | 9033983 | 2/1997 |
| JP | 9311362 | 12/1997 |
| JP | 2000039646 | 2/2000 |
| JP | 2001033844 | 2/2001 |
| JP | 2001066660 | 3/2001 |
| JP | 2001083568 | 3/2001 |

* cited by examiner

*Primary Examiner*—Melissa J Koval
(74) *Attorney, Agent, or Firm*—Michaud-Kinney Group LLP

(57) ABSTRACT

A shutter for an optical apparatus has multiple sectors and an operation member. Each of the multiple sectors has a cam opening for engagement and is pivotally provided to open and close a shutter opening, the operation member moves each of said multiple sectors in engagement with the cam opening, and the cam opening of at least one sector that is one of the multiple sectors is formed to change a moving direction of said at least one sector, when the operation member moves said at least one sector to a position to close the shutter opening.

13 Claims, 14 Drawing Sheets

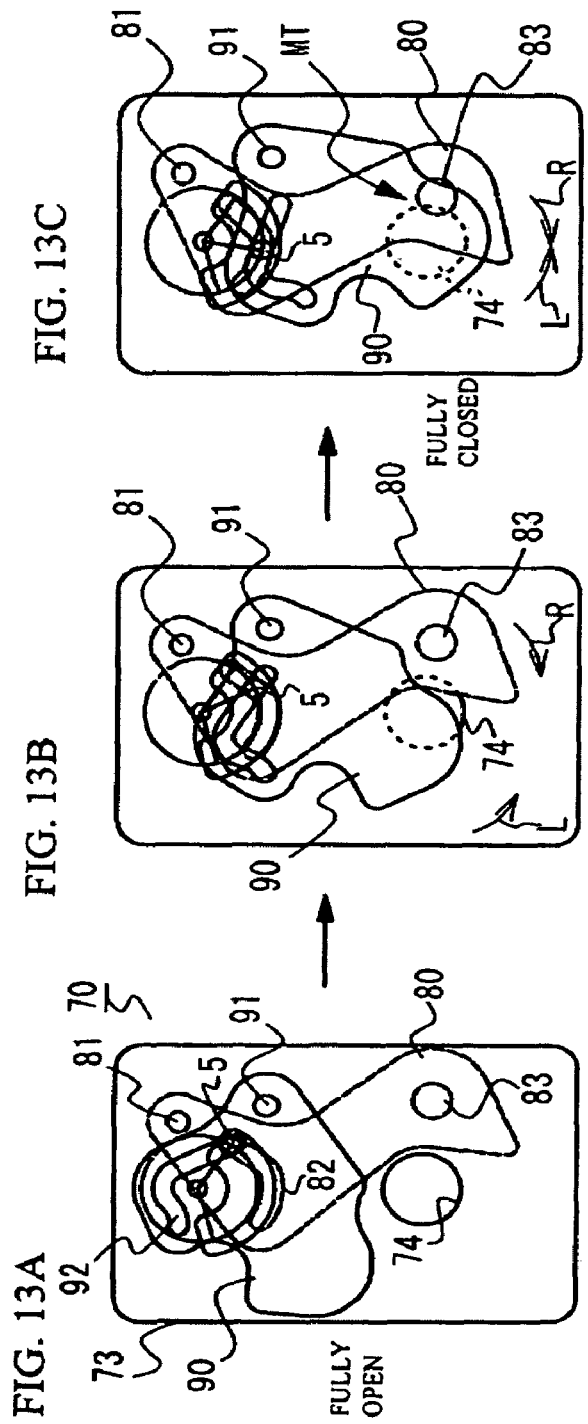

FIG. 14
PRIOR ART
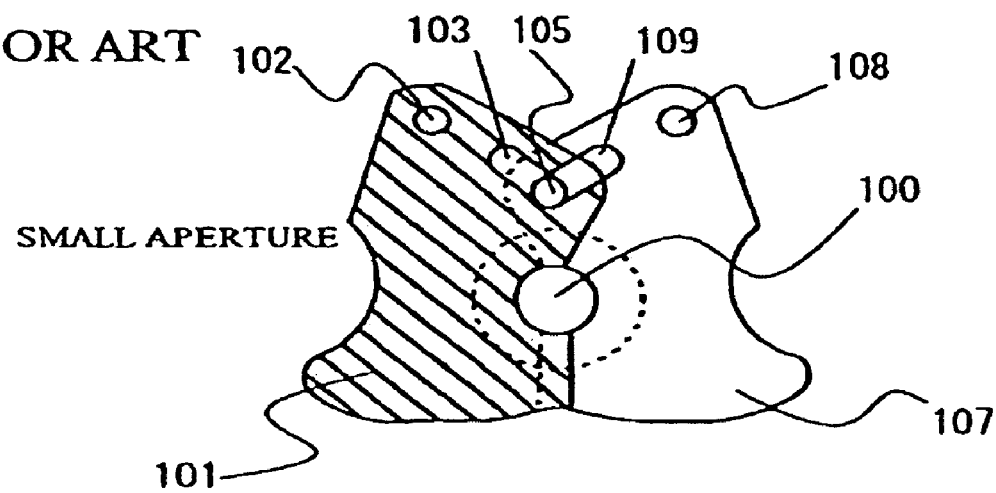
SMALL APERTURE
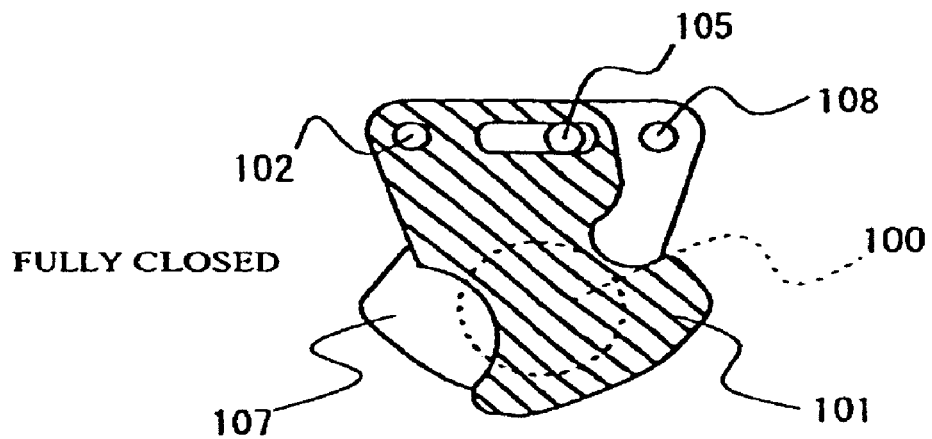
FULLY CLOSED
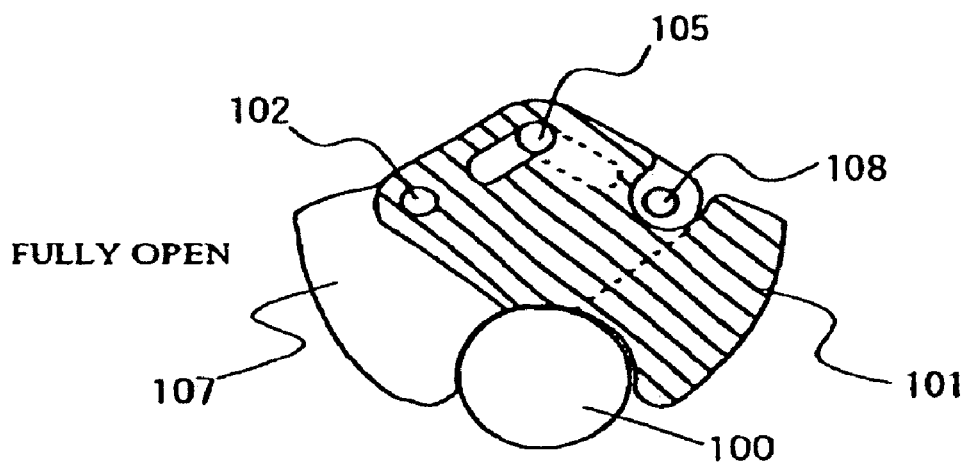
FULLY OPEN

SHUTTER AND OPTICAL APPARATUS HAVING THE SAME APPARATUS

CROSS-REFERENCE TO RELATED APPLICATIONS

This application is a continuation of and claims priority to U.S. patent application Ser. No. 11/343,607, filed Jan. 30, 2006 which is a continuation of and claims priority to International Patent Application No. PCT/JP2004/010616 filed on Jul. 26, 2004, which claims priority to Japanese Patent Application No. 2003-283161 filed on Jul. 30, 2003, and Japanese Patent Application No. 2003-308149 filed on Aug. 29, 2003. The subject matter of these patent documents is incorporated by reference herein in its entirety.

FIELD OF THE INVENTION

This invention generally relates to shutters for optical apparatuses, and more particularly, to a shutter suitable for use in an optical apparatus such as a digital camera or camcorder.

DESCRIPTION OF THE RELATED ART

With respect to a shutter of a camera, there is a description in, for example, Japanese Patent Application Publication No. 2000-39646 (hereinafter, referred to as Document 1). Document 1 discloses a technique of driving opening and closing of two sectors, which are an upper aperture blade and a lower aperture blade, by use of a stepping motor. FIG. 14 shows the conventional sector operation described in Document 1. A first sector 101 is pivotally provided with respect to a fixed shaft 102, and a second sector 107 is pivotally provided with respect to a fixed shaft 108. These sectors 101 and 107 are movably arranged in positions that open and close a shutter opening 100 provided in a shutter substrate.

Specifically, an opening 103 is provided in the first sector 101. In the same manner, an opening 109 is provided in the second sector 107. The openings 103 and 109 are pierced by an operation pin 105, and are engaged with each other, the operation pin 105 being swung by the stepping motor, not shown. Thus, as shown in FIG. 14, it is possible to form a small aperture state, fully closed state, and fully open state by moving the operation pin 105 in a given direction to control the positions of the two sectors 101 and 107.

In the shutter disclosed in Document 1, the openings 103 and 109 provided in the first sector 101 and the second sector 107 have simple structures. As the operation pin 105 moves upwardly, the above-mentioned first sector 101 and the second sector 107 form the small aperture state, fully closed state, and fully open state. In contrast, if the operation pin 105 moves downwardly from the fully open state, an opposite state is formed. Here, the fully closed state is existent between the small aperture state and the fully open state.

Now, an inertial force (inertia) works, when the sectors 101 and 107 are moved from a given position to another. When the operation pin 105 that is driven by the stepping motor moves the sectors 101 and 107 to the fully closed position from the small aperture position, or when the operation pin 105 moves the sectors 101 and 107 to the fully closed position from the fully open position, which causes the hunting in some cases, according to the inertial force applied to the sectors and brake on the stepping motor side. That is to say, the inertial force is applied onto the sectors 101 and 107, although they stop moving at the fully closed position from a moving state. There is a force that makes the sectors 101 and 107 overrun from the fully closed position (stop position). On the other hand, a breaking effort (braking force) is electrically or magnetically applied onto the electrically controlled stepping motor so that the rotor stops rotating in a given position. Therefore, on the fully closed position, the above-described inertial force and the braking force collide with each other to induce a vibrating state (the hunting) in moving directions of the sectors 101 and 107. If the sectors 101 and 107 vibrate in this manner, the sectors are misaligned from predetermined fully closed position and let the light come in the opening 100 (hereinafter, referred to as reexposure state). As described heretofore, it is impossible to take a photo appropriately by using the optical apparatus, such as a camera, having the shutter that cannot shield the light certainly on the originally configured fully closed position.

In Patent document 1, however, the small aperture state, fully closed state, and fully open state are formed with the use of two sectors, yet there is another type of shutter that employs a third sector for a small aperture to have three sectors in total and form the small aperture state, fully closed state, and fully open state in the same manner. The shutter having three sectors also has the above-described problem of resulting in the hunting when the sectors are moved.

In addition, it can be considered that the hunting on the above-described fully closed position can be controlled electrically. For example, there is a known technique in which while the sectors are being moved by driving the stepping motor, an electrical braking pulse is applied to control to drive the stepping motor in an opposite direction immediately before the sectors stop moving. However, as compared to the conventional shutters, the shutters these days have a high shutter speed with the brake timing width extremely narrow. Furthermore, there are differences more or less in the shutter among individual pieces after production. So, it is not realistic to adjust the brake timings of the individual pieces of mass-produced shutters. Accordingly, it's very much a situation in which it is difficult to suppress the hunting that occurs on the fully closed position by electrical control and the above-described problem of reexposure cannot be solved easily.

SUMMARY OF THE INVENTION

It is an object of the present invention to solve the above-mentioned problem and provide a shutter for an optical apparatus having a simple structure that can prevent the hunting that occurs when sectors stop moving.

According to one aspect of the present invention, there is provided a shutter for an optical apparatus, the shutter having multiple sectors and an operation member, each of the multiple sectors having a cam opening for engagement and being pivotally provided to open and close a shutter opening, the operation member moving each of the multiple sectors in engagement with the cam opening, and the cam opening of at least one sector that is one of the multiple sectors is formed to change a moving direction of the at least one sector, when the operation member moves the at least one sector to a position to close the shutter opening. When a given sector comes to a position to close the shutter opening, the moving direction is changed. This makes it possible to realize the structure that can prevent the hunting from occurring when the sector is in the moving state. Therefore, it is possible to provide the shutter for the optical apparatus that can prevent the problem of reexposure with a simple structure by configuring the multiple sectors to change the moving directions thereof on the position of the shutter opening.

According to another aspect of the present invention, there is provided an optical apparatus having the above-described shutter.

BRIEF DESCRIPTION OF THE DRAWINGS

FIG. 13A through FIG. 13E are views showing the shutter 70 so that the change in the sectors can be confirmed when the state is shifted in the order of the fully open state, the fully closed state, and the small aperture state; and FIG. 14 shows a sector operation in a conventional technique.

DESCRIPTION OF THE PREFERRED EMBODIMENTS

Figure 1A:
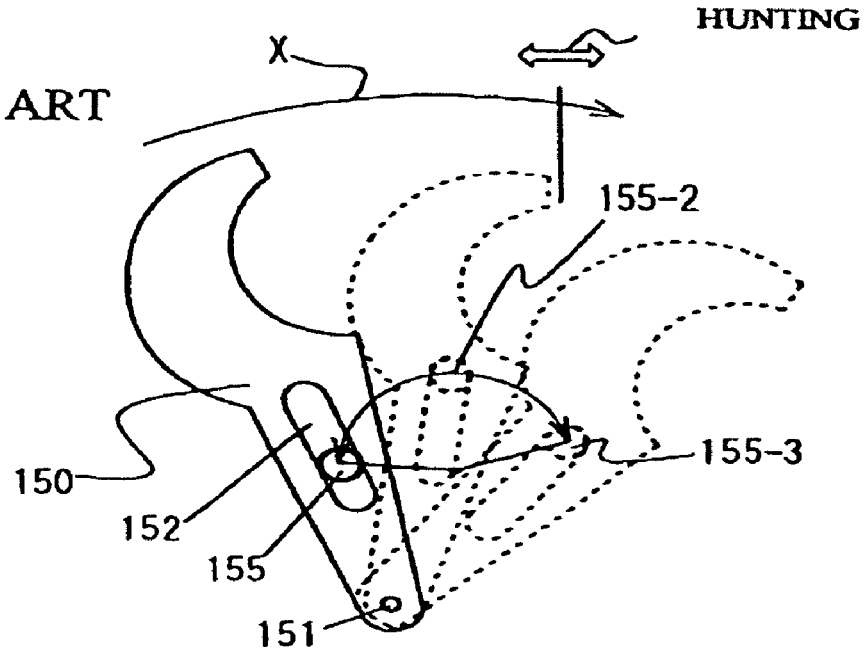
FIG. 1A shows a conventional cam mechanism and FIG. 1B shows a cam mechanism in accordance with the present invention.
Figure 1B:
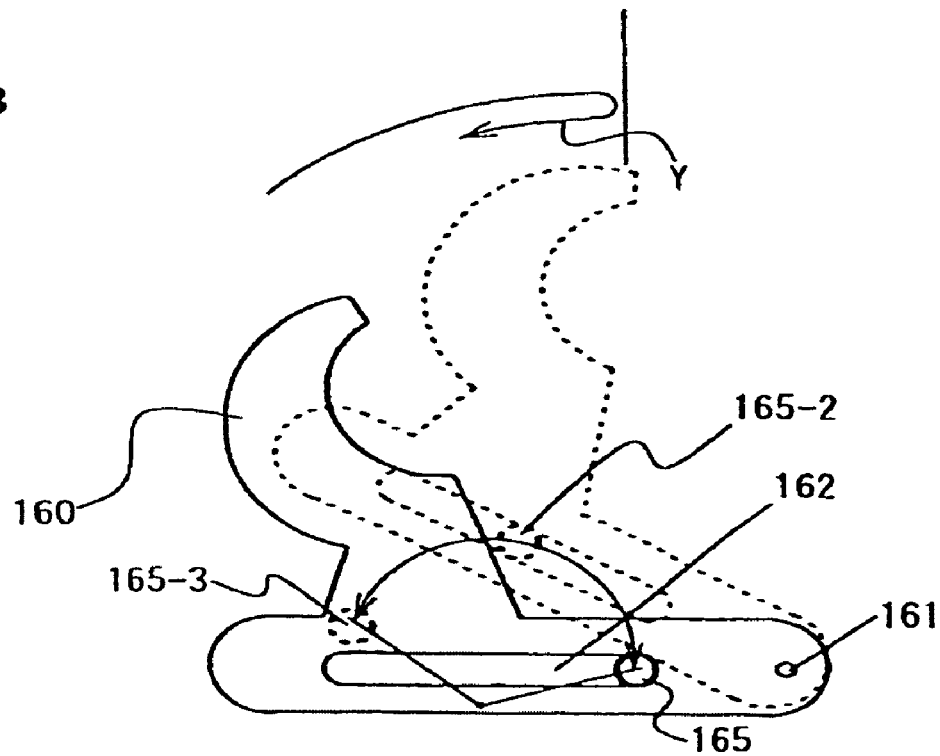

A description will now be given, with reference to the accompanying drawings, of embodiments of the present invention. Before describing specific embodiments of the present invention, the basic concept employed in the present invention will be described for facilitating the understanding of the present invention, with reference to FIG. 1A and FIG. 1B. FIG. 1A and FIG. 1B show a case where one sector is driven by a cam mechanism. FIG. 1A shows a conventional cam mechanism and FIG. 1B shows a cam mechanism in accordance with the present invention.

In FIG. 1A, a sector 150 is pivotally provided around a fixed shaft 151. A cam opening 152 is formed for engagement in the sector 150. An operation pin 155, which serves as an operating member, is engaged with the cam opening 152. The operation pin 155 is moved by a stepping motor, not shown, within a range from a position 155 to another position 155-3. In a configuration shown in FIG. 1A, in order to move the sector 150 to an intermediate position, the stepping motor is driven to move the operation pin 155 to yet another position 155-2 and then stop moving.

As discussed above, however, the inertia works on the sector 150 in a moving state. When the sector 150 comes to the intermediate position (155-2), there is a force that is about to overrun the afore-mentioned position as indicated by an arrow X, even if the operation pin 155 stops moving. In contrast, a braking force is applied from the stepping motor side, resulting in hunting. In the cam structure shown in FIG. 1A, the intermediate position is a passing point. Therefore, unless the braking force is applied to the sector 150 from the stepping motor, the sector 150 freely moves to a right-hand end. As described, when the moving sector 150 is stopped, the sector is configured to be capable of moving backward and forward in a moving direction. This is a main cause of generating the hunting. Patent document 1 described above (with reference to FIG. 14) has the afore-mentioned structure, which causes the hunting.

FIG. 1B shows a cam mechanism in accordance with the present invention, in contrast to FIG. 1A. Members included in FIG. 1B are same as those included in FIG. 1A. That is to say, a sector 160 is pivotally provided around a fixed shaft 161. A cam opening 162 is formed for engagement in the sector 160, and an operation pin 165 is engaged with the cam opening 162. The operation pin 165 is moved by the stepping motor, not shown, within a range from a position 165 to another position 165-3.

In the cam mechanism shown in FIG. 1B, when the sector 160 reaches an intermediate position indicated by a dotted line, the cam opening 162 is provided to have a shape so that the moving direction is changed to an original Y direction (different direction). Accordingly, the above-mentioned hunting does not occur. In particular, in FIG. 1B, the sector 160 operates to return in a reversed direction. This makes it possible to stop the sector 160 at a desired position (fully closed position) accurately, as compared to the mechanism in FIG. 1A, where the sector is stopped at the intermediate position by only the braking force of the stepping motor.

The present invention utilizes the sector mechanism shown in FIG. 1B to drive the shutter for a camera. FIG. 1B shows a case where one sector is driven for facilitating the understanding, yet it is possible to form a fully open state, fully closed state, and aperture state in the shutter opening as necessary by combining multiple sectors to move simultaneously. The sector 160 exemplarily shown in FIG. 1B is provided for facilitating the understanding of the concept of the present invention. Therefore, this does not necessarily show a most suitable shape as a sector in use for a shutter for an optical apparatus.

In addition, the cam opening 162 formed in the sector 160 is provided in a linear shape, yet the shape is not limited to this. The cam opening (namely, cam shape) may be designed as necessary to have a linear or curved shape, for example, in consideration of the sector shape, the position of the fixed shaft that turns the sector, and a turning radius, moving range or the like of the operation pin, so that the sector changes a moving direction from a middle position as described above (for example, the fully closed position).

First Embodiment

Figure 2:
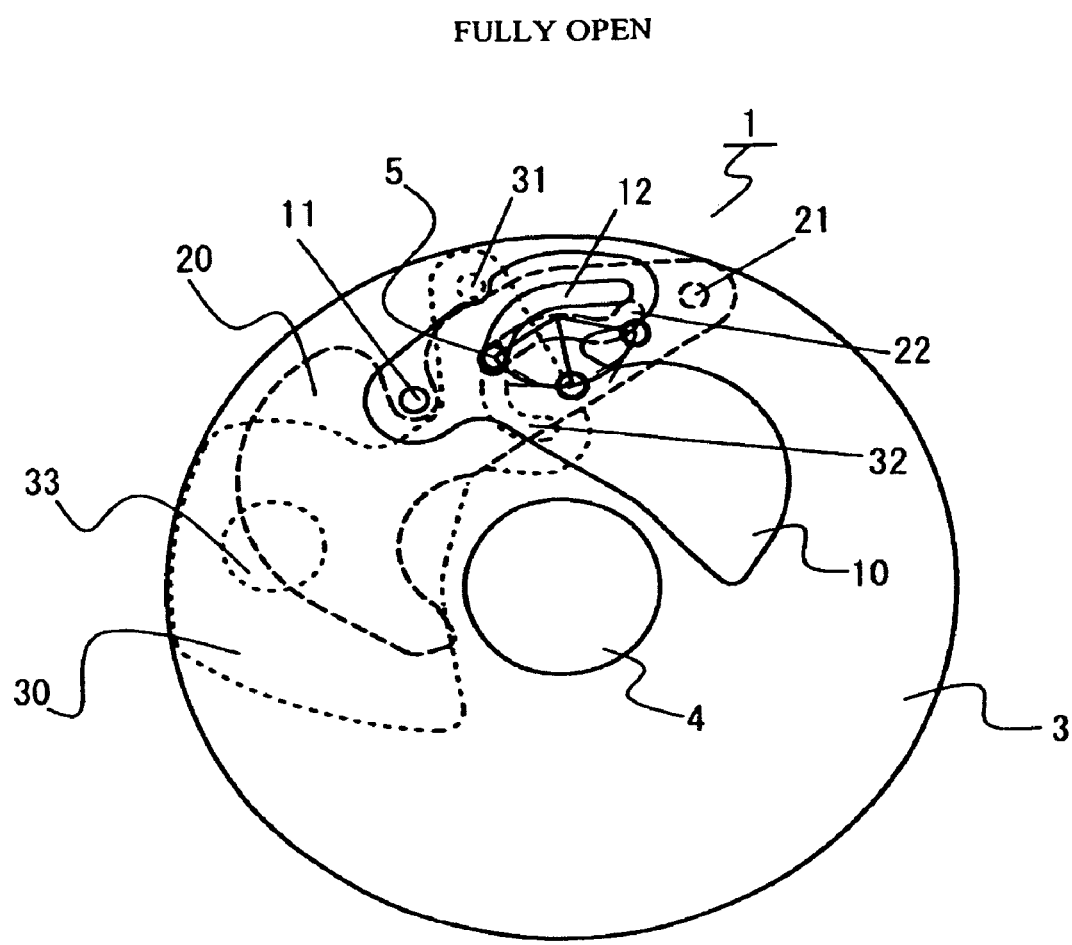
FIG. 2 is a view showing a shutter in accordance with the first embodiment of the present invention in a fully open state.
Figure 4:
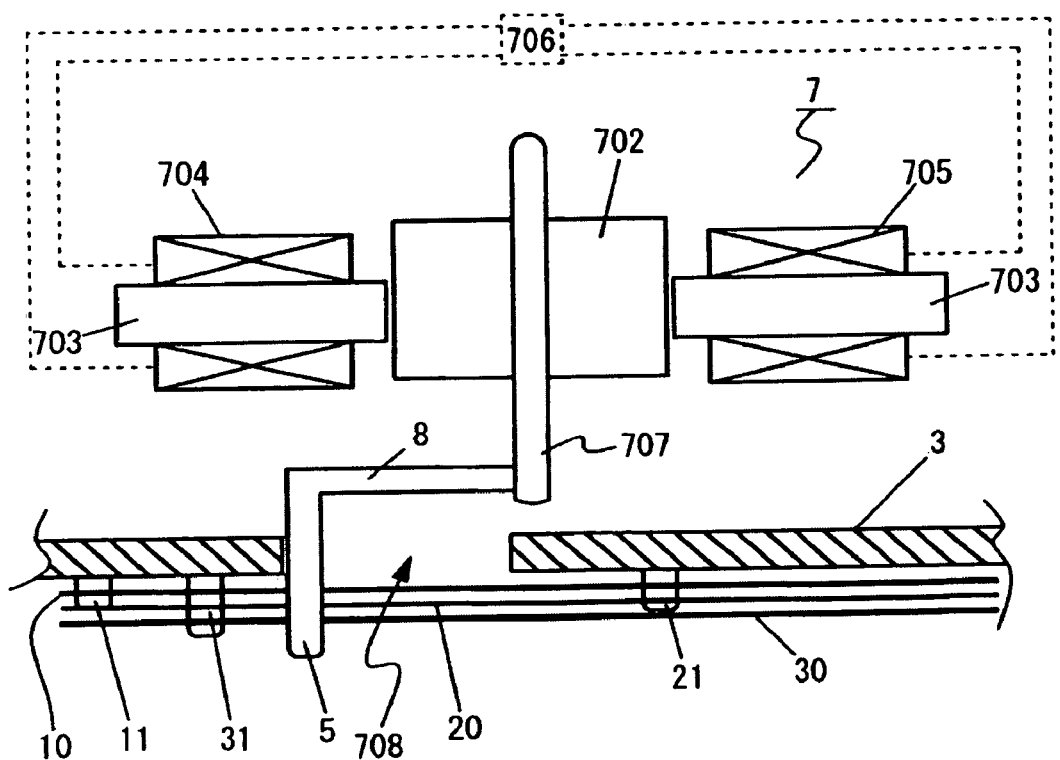
FIG. 4 is a plan view showing a positional relationship of a shutter substrate and a motor included in the shutter shown in FIG. 2.
Figure 5:
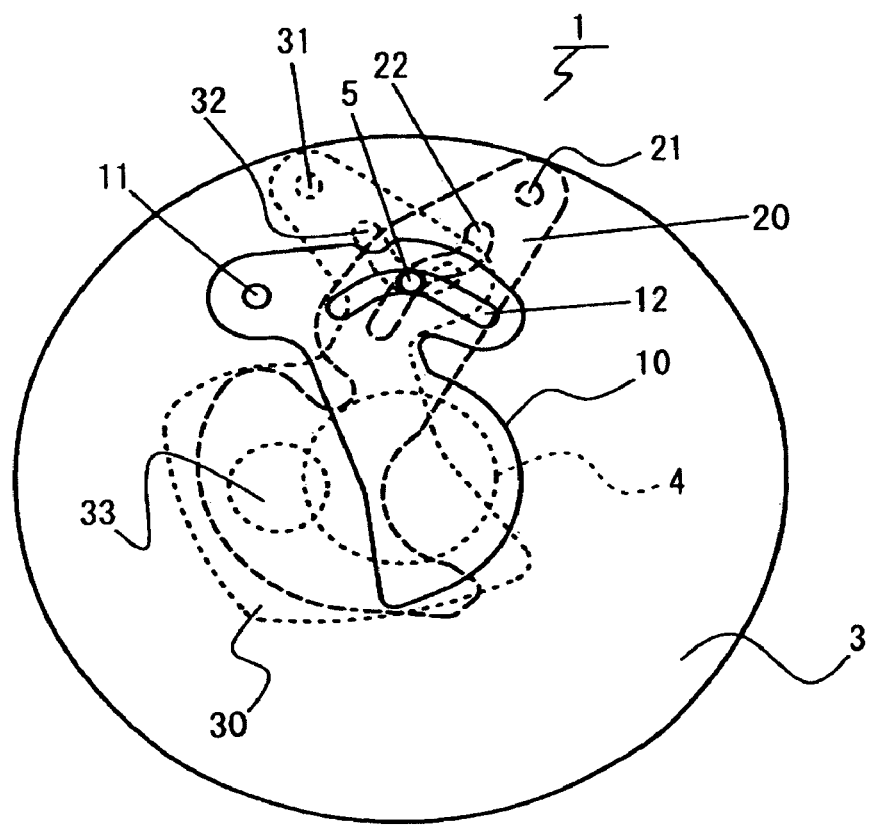
FIG. 5 shows the shutter 1 in accordance with the first embodiment of the present invention in a fully closed state.
Figure 6:
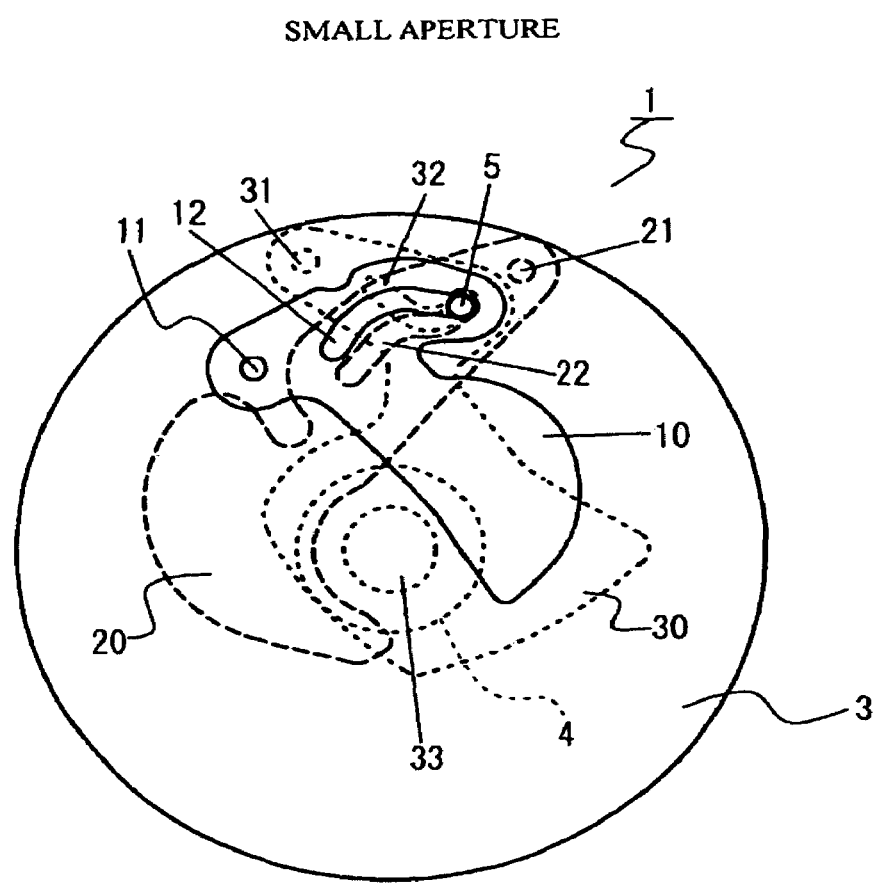
FIG. 6 is a view showing the shutter in accordance with the first embodiment of the present invention in a small aperture state.

A description will be given, with respect to the drawings, of a shutter in accordance with a first embodiment of the present invention. FIG. 2 through FIG. 6 show the shutter in accordance with the first embodiment of the present invention. FIG. 2 is a view showing a shutter 1 in accordance with the first embodiment of the present invention in a fully open state. FIG. 3A through FIG. 3D are views partially showing a portion of the shutter 1 shown in FIG. 2. FIG. 4 is a plan view showing a positional relationship of a shutter substrate and a motor included in the shutter shown in FIG. 2. In addition, FIG. 5 shows the shutter 1 in a fully closed state. FIG. 6 is a view showing the shutter 1 in a small aperture state.

First, referring to FIG. 2, the shutter 1 includes three sectors. The shutter 1 includes a shutter substrate 3 and three sectors 10, 20, and 30. The sector 10 is a first shutter blade, the sector 20 is a second shutter blade, and the sector 30 is an aperture blade having a small aperture opening. Here, the first sector 10 is indicated by a solid line, the second sector 20 is indicated by a long dashed line, and the third sector 30 is indicated by a dotted line. Here, a shutter opening 4 is formed in the center of the shutter substrate 3.

The first sector 10 is pivotally provided around a fixed shaft 11, and includes a cam opening 12. The second sector 20 is pivotally provided around a fixed shaft 21, and includes a cam opening 22. The third sector 30 is pivotally provided around a fixed shaft 31, and includes a cam opening 32 and a small aperture opening 33. An operation pin (an operation member) 5, which is driven within a given range, is engaged with the afore-mentioned three cam openings 12, 22, and 32 by the stepping motor that is not shown. In other words, one operation pin 5 pierces the three cam openings 12, 22, and 32, and it is configured that the movement of the operation pin 5 makes all the sectors 10, 20, and 20 move to given positions.

Figure 3A:
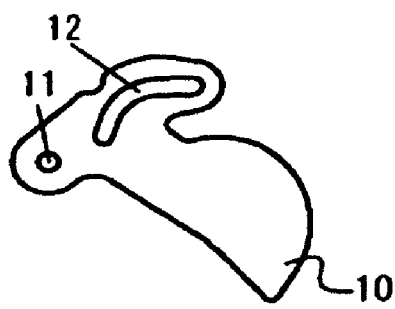
FIG. 3A through FIG. 3D are views showing portions of the shutter shown in FIG. 2.
Figure 3B:
Figure 3C:
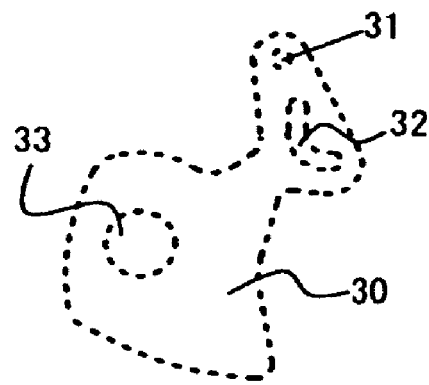
Figure 3D:
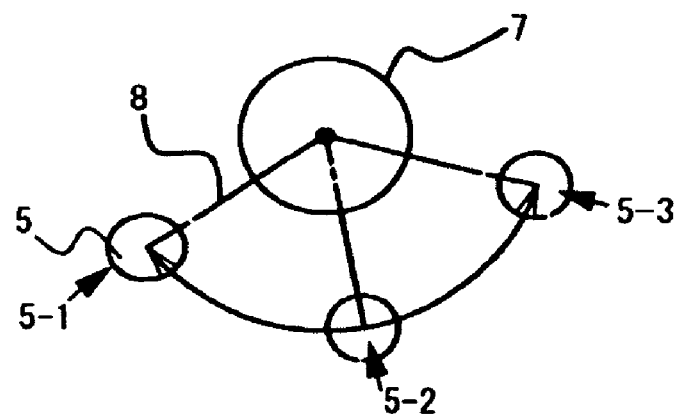

FIG. 3A through FIG. 3D are views showing a portion of members shown in FIG. 2. FIG. 3A shows the first sector 10, FIG. 3B shows the second sector 20, and FIG. 3C shows the third sector 30. FIG. 3D is an enlarged view of the moving range of the operation pin 5. A position 5-1 corresponds to the fully open position shown in FIG. 2. A position 5-2 corresponds to the fully closed position, as will be shown in FIG. 5. A position 5-3 corresponds to the small aperture position, as will be shown in FIG. 6. In the shutter 1, the sectors 10, 20, and 30 form the fully open state, fully closed state, and small aperture state, while the operation pin 5 is moving in one direction. In particular, when the first sector 10 and the second sector 20 are positioned in the shutter opening 4 in the fully closed state, the moving directions thereof are changed, whereas the operation pin 5 is moving in one direction. This will be apparent in a description of operation hereafter. FIG. 3D shows a stepping motor 7 that drives the operation pin 5 and an arm portion 8 that extends from the stepping motor 7. The operation pin 5 is fixed to another edge of the arm portion 8. Therefore, when the stepping motor 7 rotates in a given range, the operation pin 5 provided on a tip of the arm portion 8 swings in a given range, as shown.

FIG. 4 is a view schematically showing an arrangement relationship of the shutter substrate 3 and the stepping motor 7 included in the shutter 1 shown in FIG. 2 in a plan view. The stepping motor 7 includes a rotor 702 and a stator 703 that has a shape of U and is provided in an outer circumference thereof. FIG. 3A through FIG. 3D show an end side of the stator 703. Two coils 704 and 705 are wound around the stator 703. A control circuit 706 controls to drive the coils 704 and 705.

The shutter substrate 3 includes the shutter opening 4 as described above, yet is not shown in FIG. 4. The three sectors 10, 20, and 30 are arranged along a substrate surface on the side of a front surface of the shutter substrate 3. These sectors are the first sector 10, the second sector 20, and the third sector 30, from the side of the shutter substrate 3. The stepping motor 7 is arranged on the back side of the shutter substrate 3.

The position of the opening cannot be confirmed in FIG. 4, yet the first sector 10 has an opening engaged with the fixed shaft 11 provided in the substrate 3 and another opening engaged with the operation pin 5 connected to the rotor 707 of the stepping motor 7. In addition, the second sector 20 includes an opening fit with the fixed shaft 21 provided in the substrate 3 and another opening engaged with the afore-mentioned operation pin 5. In the same manner, the third sector 30 includes an opening fit with a fixed shaft 31 provided in the substrate 3 and another opening engaged with the afore-mentioned operation pin 5. These sectors 10, 20, and 30 swing respectively in respectively different trajectories, according to the rotational movement of the operation pin 5. The movements of the sectors 10, 20, and 30 will be apparent with reference to FIG. 5 through FIG. 8.

The arm portion 8, which extends in a radial direction, is connected to a rotor 707 of the stepping motor 7 provided on the backside of the substrate 3. The operation pin 5 is connected to an end of the arm portion 8, and extends from the end of the arm portion 8 to an opposite side of the substrate 3 through an opening 708 having a fan shape provided in the shutter substrate 3. The openings respectively provided in the sectors 10, 20, and 30 are engaged with the operation pin 5 that extends on the side of a front surface. Therefore, as the rotor 707 of the stepping motor 7 turns, the operation pin 5 turns in accordance with this turn, and the sectors 10, 20, and 30 swing in given trajectories.

In the shutter 1, the first sector 10 and the second sector 20 are designed to operate in the same manner as that of the sector described in FIG. 1A and FIG. 1B. That is to say, the cam opening 12 in the first sector 10 and the cam opening 22 of the second sector 20 are provided to have such shapes that the first sector 10 and the second sector 20 reach the fully closed position in accordance with the movement of the operation pin 5 and then change the moving directions thereof. A description will be given, with reference to FIG. 2 (fully open), FIG. 5 (fully closed), and FIG. 6 (small aperture).

In the fully open state as shown in FIG. 2, the operation pin 5 is positioned on the left end of the moving range. At this time, the sectors 10, 20, and 30 are moved to positions so as to open the shutter opening 4, according to the shapes of the cam openings 12, 22, and 32. Next, referring to FIG. 5, the operation pin 5 moves to a position that corresponds to the fully closed state, and the sectors 10, 20, and 30 also move to positions to close the shutter opening 4. At this time, in the shutter 1, there is a characteristic change in the positional relationship of the operation pin 5 and the cam opening 12 in the first sector 10 and the cam opening 22 in the second sector 20. That is, the sectors 10 and 20 are guided to come near the shutter opening 4 by the movement of the operation pin 5, when the state is changed from FIG. 2 (fully open) to FIG. 5 (fully closed). However, once the position in FIG. 5 (fully closed state) is achieved, the positional relationship of the cam opening 12 and the cam opening 22 with respect to the operation pin 5 is changed. When the first sector 10 and the second sector 20 further move, the directions are reversed to move away (recede) from the shutter opening 4. Therefore, the sectors 10 and 20 are stopped stably at the (fully closed) position shown in FIG. 5 without causing the hunting.

Moreover, in the shutter 1, when the operation pin 5 positioned on the fully closed position is further moved to the right, the shutter opening 4 is released by the first sector 10 and the second sector 20 that are returning. At this time, the third sector 30 is provided to be positioned in the shutter opening 4 and form the small aperture state. As described above, the first sector 10 and the second sector 20 are reciprocated at the fully closed position that serves as a turning point. However, the third sector 30 moves in one direction toward the shutter opening 4, while changing the state to the fully open state, the fully closed state, and the small aperture state. In the end, the third sector 30 forms the small aperture state. Accordingly, in the shutter 1, it is possible to form the fully open state, the fully closed state, and the small aperture state, by utilizing the operation pin 5 that moves in one direction to suppress the hunting and move the sectors efficiently.

The shutter 1 in accordance with the first embodiment of the present invention includes the fully closed state while one operation pin 5 is moving in one direction. When the fully closed state is achieved, the first sector 10 and the second sector 20 change the moving directions thereof. Accordingly, when the fully closed state is achieved, namely, when the first sector 10 and the second sector 20 are moved to close the shutter opening 4, this does not cause the hunting as seen in the conventional shutter. Therefore, this does not cause the problem of reexposure on the fully closed position. Accordingly, it is possible to capture a sharp image by using an optical apparatus such as a digital still camera that include the shutter in accordance with the present invention as a part. In addition, the shutter 1 does not cause the hunting unlike the conventional one, also making it possible to realize the structure that does not apply loads excessively onto the stepping motor that generates the braking force.

Figure 7:
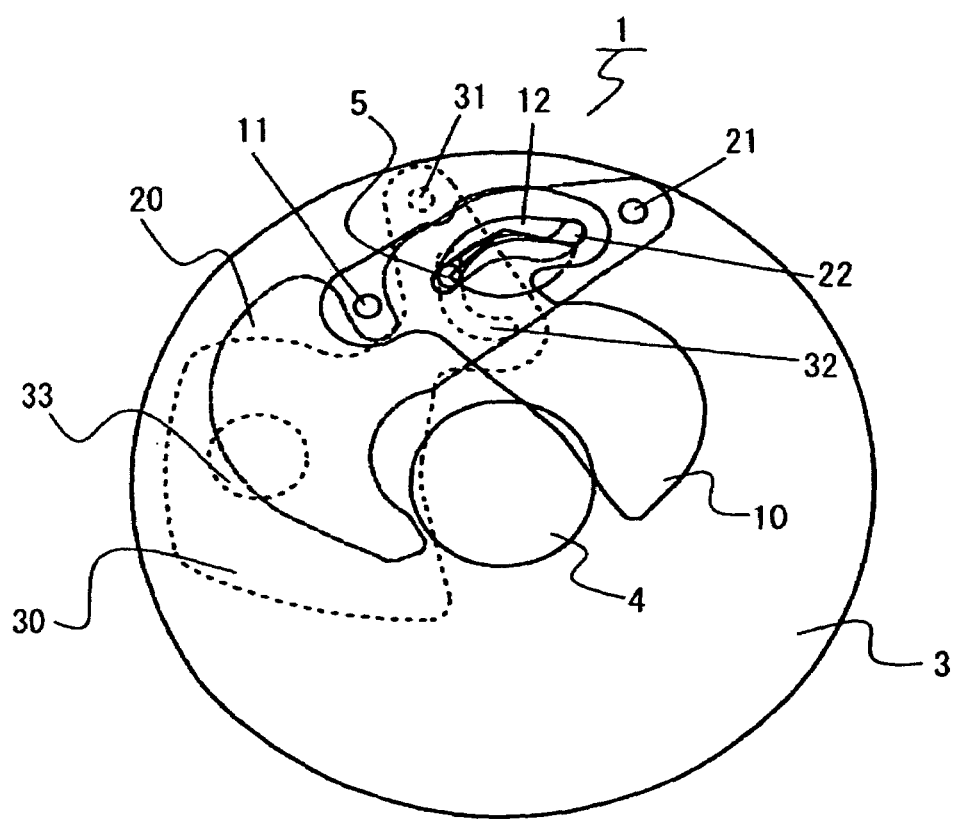
FIG. 7 shows the shutter on the way of moving to the fully closed state from the fully open state.
Figure 8:
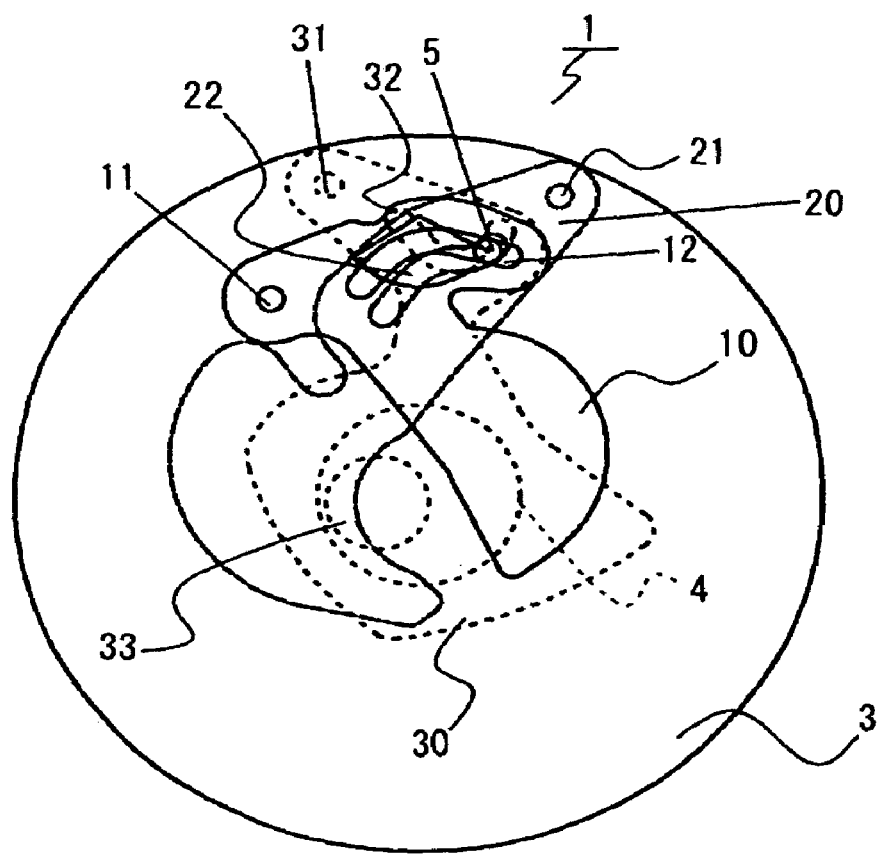
FIG. 8 shows the shutter on the way of moving to the fully closed state from the small aperture state.

Furthermore, FIG. 7 shows the above-mentioned shutter 1 that is on the way of moving to the fully closed state from the fully open state. FIG. 8 shows the above-mentioned shutter 1 that is on the way of moving to the fully closed state from the small aperture. When the shutter 1 is shifted from the fully open state to the fully closed one, as shown in FIG. 7, the small aperture blade 30 (the sector 30) is configured to move first to a direction to close the shutter opening 4. That is to say, in the shutter 1, the sector 30 implements the operation to partially shield the shutter opening 4 earlier than the originally provided the shutter blades 10 and 20. Such operation can be realized with an outer shape of the sector 30 and the shape of the cam opening 32. The shutter 1 changes the state to the fully closed one shown in FIG. 5 from that shown in FIG. 7. In this manner, the small aperture blade 30 operates together with the originally provided shutter blades 10 and 20 to form the fully closed state in the shutter 1. This enables to close the shutter opening 4 more rapidly.

In addition, FIG. 8 shows the state, while changing to the fully closed state shown in FIG. 5 from the small aperture state shown in FIG. 6. With respect to the sectors 10 and 20, the sectors 10 and 20 recede not to interfere with the small aperture opening 33 in the small aperture state shown in FIG. 6, yet are positioned to partially shield the shutter opening 4. This makes it possible to shift immediately to the fully closed state from the small aperture state in the shutter 1. In other words, the shutter 1 includes the structure that can also close the shutter opening 4 more rapidly from the small aperture state.

Second Embodiment

Figure 9:
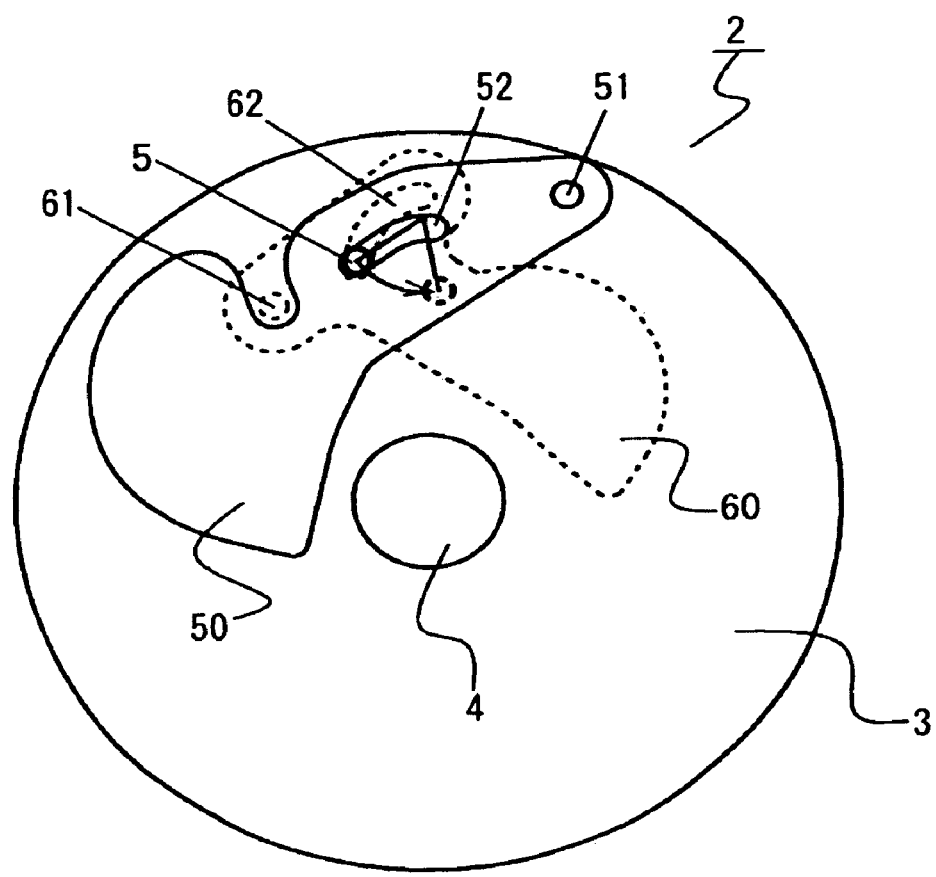
FIG. 9 shows a shutter in accordance with a second embodiment of the present invention in the fully open state.
Figure 10:
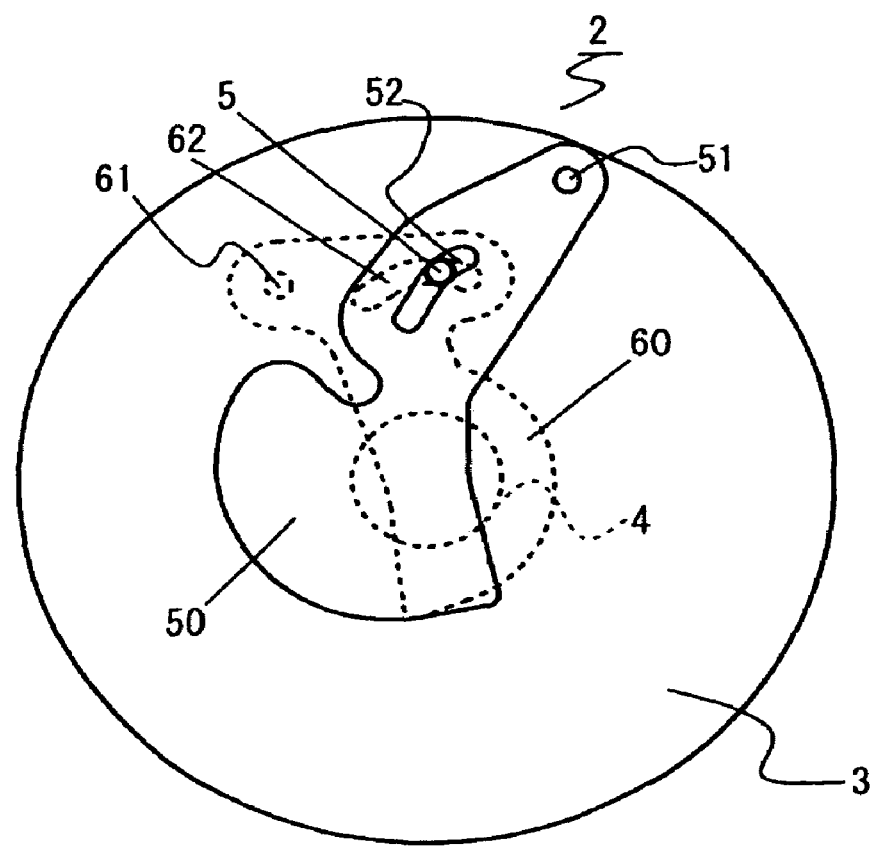
FIG. 10 shows a shutter in accordance with the second embodiment of the present invention in the fully closed state.

With reference to FIG. 9 and FIG. 10, a second embodiment of the present invention will be described. In the first embodiment of the present invention described heretofore, there are provided three sectors, one of which is a small aperture blade. In the present embodiment, a shutter 2 composed of two shutter blades is described. A first sector 50 is provided pivotally around a fixed shaft 51, and has a cam opening 52. A second sector 60 is provided pivotally around a fixed shaft 61, and has a cam opening 62. The operation pin 5, which is driven within a given range, is engaged with the afore-mentioned cam openings 52 and 62. That is to say, also in accordance with the present embodiment, one operation pin 5 pierces two cam openings 52 and 62, and the two sectors 50 and 60 are moved to given positions as the operation pin 5 moves.

In the shutter 2, the first sector 50 and the second sector 60 are designed to operate as the sectors, as described in FIG. 2. That is to say, the cam opening 52 in the first sector 50 and the cam opening 62 in the second sector 60 are formed to have such shapes that the first sector 50 and the second sector 60 change the moving directions when they reach the fully closed position due to the movement of the operation pin 5. Therefore, as seen in the first embodiment of the present invention, the sectors 50 and 60 are guided to come near the shutter opening 40 by the movement of the operation pin 5, when changing to the state in FIG. 10 (the fully closed state) from that in FIG. 9 (the fully open state). However, once the state in FIG. 10 (fully closed state) is achieved, the positional relationship of the cam opening 52 and the cam opening 62 with respect to the operation pin 5 is changed. The first sector 50 and the second sector 60 reverse the directions thereof and move away from the shutter opening 4. Accordingly, also in accordance with the present embodiment, it is possible to stop the sectors stably in the fully closed state without causing the hunting. As shown in FIG. 9, the first sector 50 and the second sector 60 are positioned so that the shutter opening 4 is interposed between the first sector 50 and the second sector 60 in the fully open state. Such design makes the sectors come near the shutter opening 4 from both sides to the fully closed position, enabling the shutter to be closed immediately.

Third Embodiment

Figure 11:
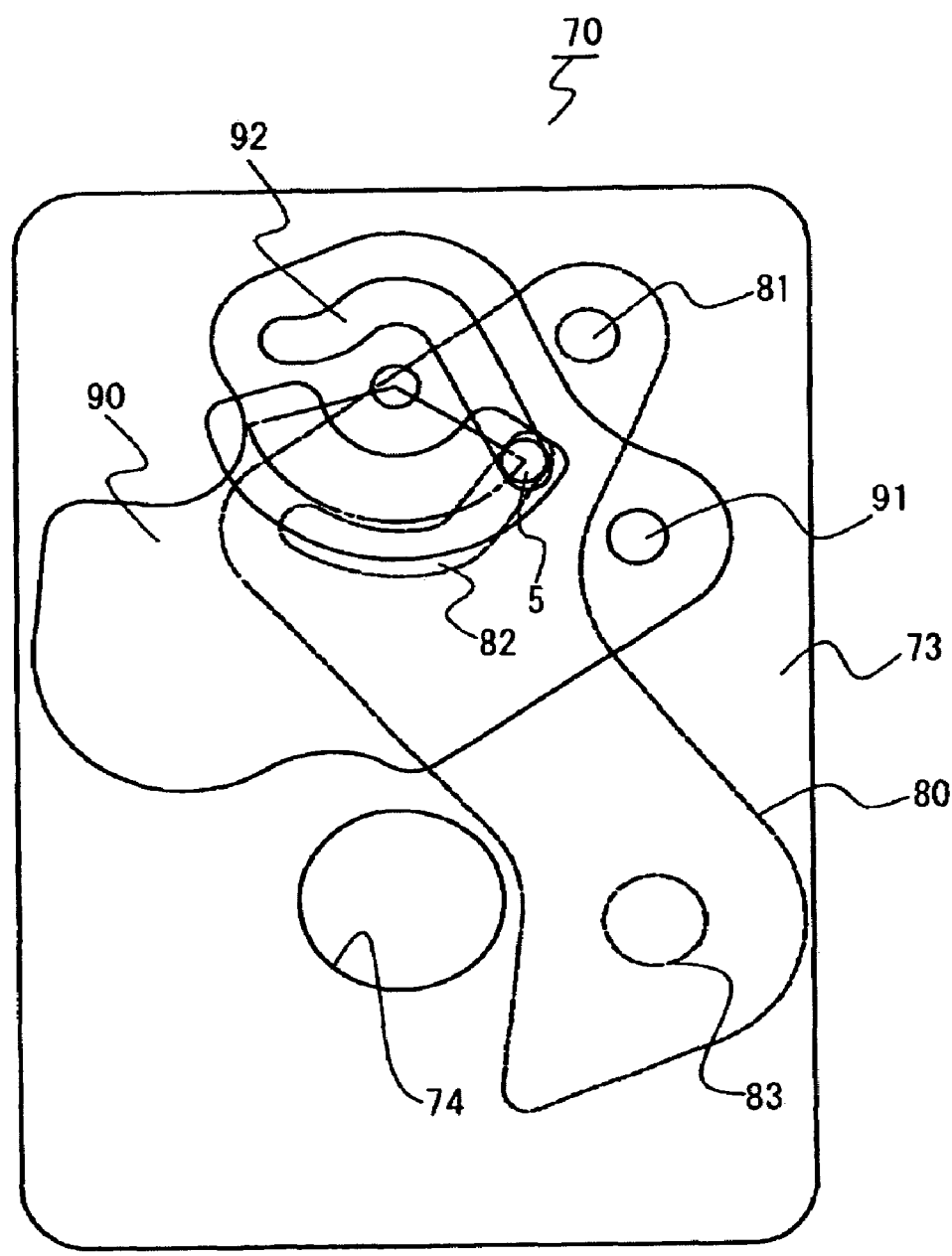
FIG. 11 shows a shutter in accordance with a second embodiment of the present invention in the fully open state.
Figure 12A:
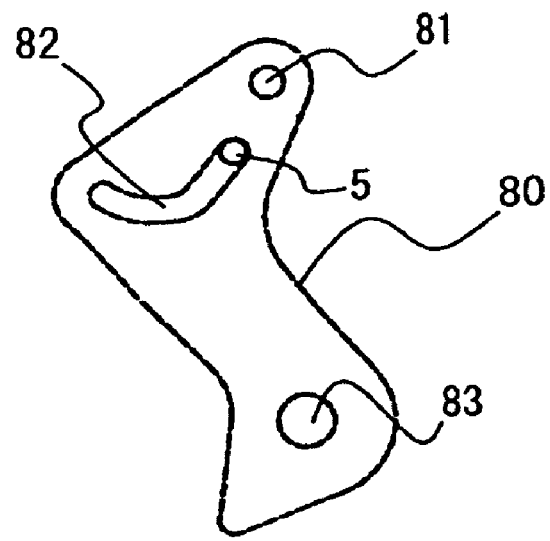
FIG. 12A through FIG. 12C are views showing portions of the shutter shown in FIG. 11.
Figure 12B:
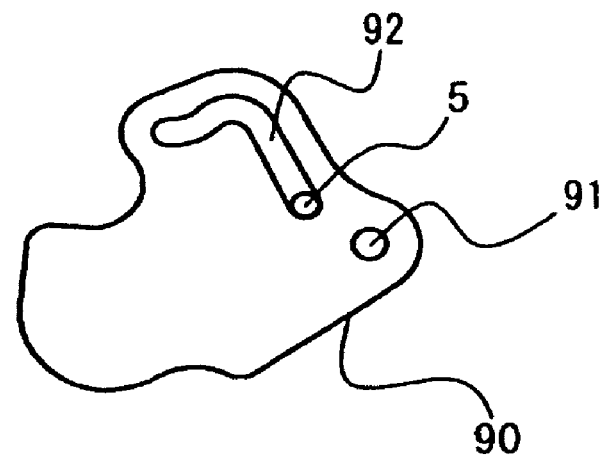
Figure 12C:
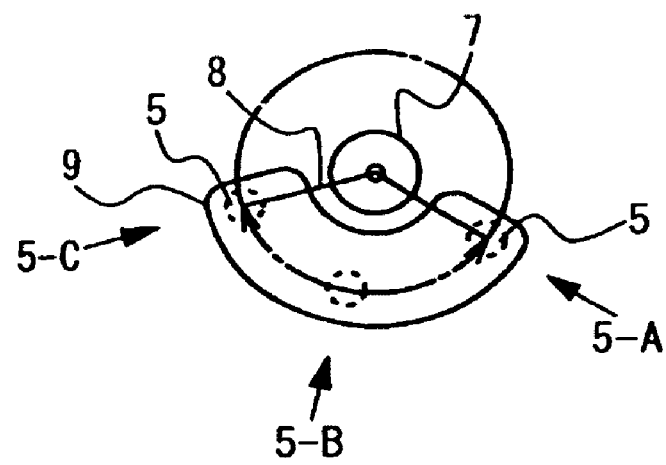

Furthermore, referring to FIG. 11 through FIG. 13E, a third embodiment of the present invention will be described. In the present embodiment, there are provided two sectors as in the second embodiment of the present invention. A shutter 70 includes one shutter blade and one small aperture blade. FIG. 11 shows the shutter 70 in accordance with the third embodiment of the present invention positioned on the fully open state. FIG. 12A through FIG. 12C show a portion of the shutter 70 shown in FIG. 11. FIG. 13A through FIG. 13E are views showing the shutter 70 so that the changes in the sectors can be confirmed when the state is shifted in the order of the fully open state, the fully closed state, and the small aperture state.

The shutter 70 includes a shutter substrate 73, a first sector 80, and a second sector 90. The shutter substrate 73 has a shutter opening 74. The first sector 80 is a small aperture blade having a small aperture opening, and also serves as a shutter blade in the fully closed state. The second shutter blade 90 is a shutter blade having a normal plate form, and has an area that can solely shield the afore-mentioned shutter opening 74. Here, the first sector 80 is indicated by a dotted line and the second sector 90 is indicated by a solid line in order to facilitate the understanding of the sectors 80 and 90 respectively.

The first sector 80 is pivotally provided around a fixed shaft 81, and includes a cam opening 82 and a small aperture opening 83. The second sector 90 is pivotally provided around a fixed shaft 91, and includes a cam opening 92. The operation pin (operation member) 5, which is driven within a given range, is engaged with the afore-mentioned cam openings 82 and 92 by the stepping motor, not shown, as in the embodiments described heretofore. That is to say, it is configured that one operation pin 5 pierces two cam openings 82 and 92 and the two sectors 80 and 90 are moved to given positions due to the movement of the operation pin 5.

FIG. 12A through FIG. 12C are views showing portions of the shutter shown in FIG. 11 to facilitate the understanding of the structure. FIG. 12A shows the first sector 80, FIG. 12B shows the second sector 90. The sector 80 is an aperture blade having the small aperture opening 83, yet moves the shutter opening 74 to the closed position for providing the fully closed state. In addition, the second sector 90 has an area that can solely shield the shutter opening 74. FIG. 12C is an enlarged view showing the moving range of the operation pin 5. A position 5-A corresponds to the fully open state shown in FIG. 11. Another position 5-B corresponds to the fully closed state, and yet another position 5-C corresponds to the small aperture state, as will be shown later.

FIG. 12C shows the stepping motor 7 that drives the operation pin 5 and the arm portion 8 that extends from the stepping motor 7. The operation pin 5 is fixed to the other end of the arm portion 8. There is provided the opening 9 having a fan shape in the shutter substrate 73 in such a manner that the operation pin 5 extrudes on the front surface side from the back side. Accordingly, the stepping motor 7 turns within a given range, and the operation pin 5 provided on the tip of the arm portion 8 swings within a given range in the opening 9 having a fan shape, as shown.

In the shutter 70, the sectors 80 and 90 swing in given trajectories and sequentially form the fully open state, the fully closed state, and the small aperture state, while the afore-mentioned operation pin 5 is moving in one direction. At this time, the first sector 80 and the second sector 90 move differently from each other. The first sector 80 having the small aperture opening 83 moves in one direction toward the shutter opening 74, as it sequentially forms the fully open state, the fully closed state, and the small aperture state. In the small aperture state, the small aperture opening 83 is positioned on the shutter opening 74.

On the other hand, the second sector 90 is positioned to close the shutter opening 74 when the state is changed to the fully closed one from the fully open one. However, the second sector 90 is moved to recede from the shutter opening 74, while the state is changing to the small aperture state from the fully closed state. That is to say, the second sector 90 is reciprocated at the fully closed position that serves as a turning point. Here, when the operation pin 5 reaches an end (a position 5-C in FIG. 12C) and returns from the end, the first and second sectors 80 and 90 operate in an opposite manner.

The operations of the sectors 80 and 90 are regulated by the positions of the fixed shafts 81 and 91 that respectively support the blades and the shapes of the cam openings 82 and 92 respectively formed in the blades. In particular, the cam opening 92 of the second sector 90, which is reciprocated at the fully closed position that serves as a turning point is formed to change the moving direction, when reaching the fully closed state due to the movement of the operation pin 5. More specifically, when the second sector 90 comes to the position that shields the shutter opening 74, the position of the cam opening 92 is shifted to a given direction. When the operation pin 5 further moves, the shape of the cam opening 92 is designed in such a manner that the second sector 90 recedes from the shutter opening 74.

FIG. 13A through FIG. 13E show the operation of the shutter 70 having the above-described configuration continuously from the fully open state to the small aperture state. A description will be given with reference to FIG. 13A through FIG. 13E. FIG. 13A shows the fully open state shown in FIG. 11. In the fully open state, the operation pin 5 is positioned on a right end (a position 5-A in FIG. 12C). At this time, the sectors 80 and 90 are moved to the positions to open the shutter opening 74 on the basis of the shapes of the cam openings 82 and 92. Here, in the shutter 70, as shown in FIG. 13A, the sectors 80 and 90 are designed to be positioned on the right and left with the shutter opening 74 interposed between the sectors 80 and 90.

Next, as shown in FIG. 13B, the operation pin 5 moves from the right end in a left-hand direction, the both sectors 80 and 90 come near each other to close the shutter opening 74. Subsequently, as shown in FIG. 13C, the both sectors 80 and 90 form the fully closed state.

A description will be given of the fully closed state shown in FIG. 13C in detail. The second sector 90 is formed to have a size that can solely shield the shutter opening 74. Accordingly, the shutter opening 74 can be closed by only the sector 90. In addition, the positional relationship of the operation pin 5 and the cam opening 92 changes characteristically, when the second sector 90 moves to the position that closes the shutter opening 74. That is to say, the second sector 90 is guided to come near the shutter opening 74, when changing to (the fully closed) state shown in FIG. 13C from (the fully open) state shown in FIG. 13A. However, once the second sector 90 comes to the position (the fully closed position) shown in FIG. 13C, the relationship between the operation pin 5 and the cam opening 92 changes. The operation pin 5 further moves in such a manner that the second sector 90 moves in a direction of coming away (returning) from the shutter opening 74. Therefore, the second sector 90 is capable of stopping stably on the position (the fully closed position) shown in FIG. 13C without causing the hunting.

Additionally, when the shutter 70 becomes the fully closed state, the first sector 80 having the small aperture opening 83 is moved in parallel to cover the shutter opening 74. As described above, the second sector 90 is solely capable of closing the shutter opening 74, yet a shielding period can be shortened, in other words, the shutter speed can be increased by moving the first sector 80 to the position to close the shutter opening 74. In order to obtain such effects, the shutter in accordance with the present embodiment has the first sector 80 and the second sector 90, which are provided on both sides with the shutter opening 74 interposed therebetween.

As seen in FIG. 13B and FIG. 13C, the first sector 80 secondarily operates to close the opening 74 from an opposite side, whereas the second sector 90 primarily closes the shutter opening 74. This enables to increase the shutter speed. Subsequently, as shown in FIG. 13C, when the fully closed state is completed, the second sector 90 solely forms the state that shields the shutter opening 74. Accordingly, even if there is a portion MT where the small aperture opening 83 in the first sector 80 partially overlaps the shutter opening 74, the first sector 80 completely closes the shutter opening 74. This does not let the light come in. Therefore, the first sector 80 has only to have an area where at least the small aperture state can be formed, enabling the shutter to be small.

In addition, in the shutter 70, when the operation pin 5 further moves in a left-hand direction from the fully closed state shown in FIG. 13C, the first sector 80 further moves toward the shutter opening 74 to form the small aperture state, as shown in FIG. 13D. In contrast, the second sector 90 changes to turn and recede at the shutter opening 74 that serves as an end point. In FIG. 13A through FIG. 13E, an arrow R indicates the moving direction of the first sector 80, and an arrow L indicates the moving direction of the second sector 90 how the moving direction is changed.

Lastly, as shown in FIG. 13E, the operation pin 5 comes to a left end, and then the small aperture opening 83 of the first sector 80 is positioned on the shutter opening 74 to form the small aperture state. At this time, the second sector 90 has moved to a position that does not interfere with the small aperture opening 83.

As described heretofore, the shutter 70 in accordance with the present embodiment moves two sectors efficiently to form the fully open state, fully closed state, and small aperture state, while the operation pin 5 is moving in one direction. Accordingly, this enables to simplify the sector structure. Also, in the fully closed state, two sectors operate together to close the shutter opening 74, enabling to increase the shutter speed. In addition, in the fully closed state, it is configured in such a manner that the second sector 90 primarily operates and the first sector 80 secondarily operates. This eliminates the necessity of controlling the positions of the both sectors with high accuracy, enabling to simplify the control system. Further, with respect to the second sector 90, the cam opening 92 is so formed that the moving direction thereof is changed at the fully closed state. In other words, the second sector 90 reverses the moving direction at the fully closed position to go away from the shutter opening 74. Therefore, the reexposure does not occur when the sector 90 passes the shutter opening 74 to achieve the fully closed state. Thus, it is possible to capture a clear image by use of the optical apparatus such as a digital still camera having the shutter in accordance with the present embodiment as a part.

In accordance with the first embodiment of the present invention, when the state is changed to the fully closed state from the fully open state, the first sector 10 and the second sector 20 reverse the moving directions to prevent the hunting. In addition, it is configured that such a changed direction corresponds to the direction of a case where the state is changed to the small aperture state from the fully closed state. Therefore, it is possible to smoothly achieve the fully open state, the surely and fully closed state, the small aperture state, and the reversed operations of the afore-described states.

Moreover, in the second embodiment of the present invention, the description has been given of the fully closed state and the fully open state. When the state is changed to the fully closed one shown in FIG. 10 from the fully open one shown in FIG. 9, the first sector 50 and the second sector 60 change the moving directions to opposite ones. In the shutter structure, in some cases, there is provided a contact member to regulate an angle of gradient of the sector. If the sector acutely hits this member, the sector may bounce back strongly or may be broken. The structure in accordance with the second embodiment of the present invention is capable of obtaining the effect that suppresses a contact force against the contact member.

The multiple sectors may include shutter blades and a small aperture blade, and the cam openings of the shutter blades have shapes that change the moving directions of the shutter blades when the shutter blades are moved to positions to close the shutter opening. With this configuration, it is possible to shift smoothly from a fully open state to a fully closed state and from a small aperture state to the fully closed state, without causing the hunting. If the cam openings of the shutter blades have the shapes that cause the shutter blades to be positioned on identical sides with respect to the position of the shutter opening in the fully open state and the small aperture state, it is possible to move the sectors more efficiently.

It is preferable that the cam openings of the shutter blades have the shapes that cause the shutter blades to reach the positions to close the shutter opening and change the moving directions from the positions to recede from the shutter opening, while the operation member is moving in one direction. With this configuration, it is possible to form the fully closed state and other states with the use of the shutter blade, while the moving member is moving in one direction. It is also possible to suppress the hunting in the fully closed state. In addition, if the operation member is moved to an opposite direction, it is possible to form the similar states in a reversed order.

The multiple sectors move to form a fully open state, a fully closed state, a small aperture state in this order, while the operation member is moving in one direction, the sectors including shutter blades and a small aperture blade. The shutter blades may be respectively positioned on identical sides with respect to the position of the shutter opening in the fully open state and the small aperture state; the small aperture blade may move in one direction toward the shutter opening, as changing to the fully open state, the fully closed state, and the small aperture state; and the shutter blade may be reciprocated in the fully closed state as a turning point. In this case, the small aperture blade comes close to the shutter opening as changing to the fully open state, fully closed state, and small aperture state, and the shutter blades are reciprocated to be positioned on the shutter opening only in the fully closed state. It is therefore possible to obtain the shutter for the optical apparatus that can form the fully open state, fully closed state, and small aperture state by moving the sectors efficiently and suppressing the hunting in the fully closed state.

The small aperture blade may move earlier than the shutter blades and partially shields the shutter opening, when shifting from the fully open state to the fully closed state. With this configuration, the small aperture blade makes a contribution to closing the shutter opening, enabling to close the shutter at a high speed. At least one of the shutter blades may partially shield the shutter opening in the small aperture state. This configuration enables the shutter opening to close at a high speed from the small aperture state by use of the shutter blade. Preferably, the operation member is driven by a stepping motor to move the multiple sectors in the order of the fully open state, the fully closed state, and the small aperture state, according to a rotation position.

The multiple sectors may include two shutter blades, and cam openings of the two shutter blades have shapes to respectively change the moving directions thereof, when the two shutter blades are moved to the positions to close the shutter opening. In this case, the fully open state and the fully closed state are formed by two sectors, and the hunting in each sector is prevented in the fully closed state. Preferably, the two shutter blades are positioned to interpose the shutter opening therebetween in a fully open state. This configuration makes it possible to prevent the hunting and close the shutter opening rapidly.

In addition, the sectors may include a shutter blade and a small aperture blade, and the cam opening of the shutter blade has a shape so that the moving direction of the shutter blade is changed when the shutter blade is moved to a position to close the shutter opening. In this case, the hunting is suppressed while the fully closed state is being formed by the shutter blade, and the fully closed state, and the fully closed state and the small aperture state can be formed by two sectors.

Further, the shutter blade and the small aperture blade may be moved to form a fully open state, a fully closed state, and a small aperture state in this order as the operation member moves. The shutter blade and the small aperture blade may be positioned to interpose the shutter opening therebetween in the fully open state; the small aperture blade may move in one direction toward the shutter opening as changing to the fully open state, the fully closed state, and the small aperture state; and the shutter blade may be reciprocated in the fully closed state as a turning point. In this case, it is possible to construct the shutter for the optical apparatus by moving the sectors efficiently to form the small aperture state, while the hunting is being suppressed by two sectors in the fully closed state.

With the shutter having the afore-described configuration, the reexposure cannot be caused, making it possible to capture a sharp image with the optical apparatus having the shutter, such as a digital camera or the like.

As described above, in accordance with the present invention, it is possible to provide the shutter for the optical apparatus that can prevent the hunting that occurs while the sectors are moving.

Preferred embodiments have been described in detail heretofore, yet the present invention is not limited to the above-mentioned embodiments, and other embodiments, variations and modifications may be made without departing from the scope of the present invention.

The invention claimed is:

1. A shutter for an optical apparatus, the shutter having multiple sectors and an operation member, wherein:
    each of said multiple sectors has a cam opening for engagement and is pivotally provided to open and close a shutter opening;
    said operation member moves each of said multiple sectors in engagement with said cam opening of each of said multiple sectors;
    said cam opening of at least one sector that is one of said multiple sectors is formed to change a moving direction of said at least one sector, when said operation member moves said at least one sector to a position to close said shutter opening;
    said at least one sector has no aperture configured to transverse said shutter opening;
    and wherein while said operation member is moving in one direction, said multiple sectors move to form a fully open state, a fully closed state, and a small aperture state in this order.

2. The shutter for the optical apparatus as claimed in claim 1, wherein:
    said multiple sectors include shutter blades and a small aperture blade; and
    said cam openings of said shutter blades have shapes that change moving directions of said shutter blades when said shutter blades are moved to positions to close said shutter opening.

3. The shutter for the optical apparatus as claimed in claim 2, wherein said cam openings of said shutter blades have the shapes that cause said shutter blades to be positioned on identical sides with respect to the position of said shutter opening in said fully open state and said small aperture state.

4. The shutter for the optical apparatus as claimed in claim 2, wherein said cam openings of said shutter blades have the shapes that cause said shutter blades to reach the positions to close the shutter opening and change said moving directions from said positions to recede from said shutter opening, while said operation member is moving in one direction.

5. The shutter for the optical apparatus as claimed in claim 1, wherein:
    said multiple sectors include shutter blades and a small aperture blade;
    said shutter blades are respectively positioned on identical sides with respect to the position of the shutter opening in said fully open state and said small aperture state;
    said small aperture blade moves from said fully open state to said fully closed state to said small aperture state in a single direction; and
    said shutter blades are reciprocated in said fully closed state that serves as a turning point.

6. The shutter for the optical apparatus as claimed in claim 5, wherein said small aperture blade moves earlier than said shutter blades and partially shields said shutter opening, when shifting from said fully open state to said fully closed state.

7. The shutter for the optical apparatus as claimed in claim 5, wherein at least one of said shutter blades partially shields said shutter opening in said small aperture state.

8. The shutter for the optical apparatus as claimed in claim 1, wherein said operation member is driven by a stepping motor to move said multiple sectors in the order of said fully open state, said fully closed state, and said small aperture state, according to a rotation position.

9. The shutter for the optical apparatus as claimed in claim 1, wherein said multiple sectors include two shutter blades, wherein cam openings of said two shutter blades have shapes to respectively change moving directions thereof, when said two shutter blades are moved to the positions to close said shutter opening.

10. The shutter for the optical apparatus as claimed in claim 9, wherein said two shutter blades are positioned to interpose said shutter opening therebetween in said fully open state.

11. The shutter for the optical apparatus as claimed in claim 1, wherein:
    the sectors include a shutter blade and a small aperture blade; and
    said cam opening of said shutter blade has a shape so that the moving direction of said shutter blade is changed when said shutter blade is moved to a position to close said shutter opening.

12. The shutter for the optical apparatus as claimed in claim 11, wherein:
    said shutter blade and said small aperture blade are moved to form said fully open state, said fully closed state, and said small aperture state in this order as the operation member moves;
    said shutter blade and said small aperture blade are positioned to interpose said shutter opening therebetween in said fully open state;
    said small aperture blade moves from said fully open state to said fully closed state to said small aperture state in a single direction; and
    said shutter blade is reciprocated in said fully closed state that serves as a turning point.

13. An optical apparatus having a shutter that includes multiple sectors and an operation member, wherein:
    each of said multiple sectors has a cam opening for engagement and is pivotally provided to open and close a shutter opening;
    said operation member moves each of said multiple sectors in engagement with said cam opening of each of said multiple sectors;
    said cam opening of at least one sector that is one of said multiple sectors is formed to change a moving direction of said at least one sector, when said operation member moves said at least one sector to a position to close said shutter opening;
    said at least one sector has no aperture configured to transverse said shutter opening;
    and wherein while said operation member is moving in one direction, said multiple sectors move to form a fully open state, a fully closed state and a small aperture state in this order.

* * * * *